United States Patent
Hardage, Jr. et al.

(10) Patent No.: US 9,928,115 B2
(45) Date of Patent: Mar. 27, 2018

(54) HARDWARE MIGRATION BETWEEN DISSIMILAR CORES

(71) Applicant: Apple Inc., Cupertino, CA (US)

(72) Inventors: James N. Hardage, Jr., Austin, TX (US); Daniel U. Becker, San Jose, CA (US); Christopher M. Tsay, Austin, TX (US); Richard F. Russo, San Jose, CA (US); Shih-Chieh R. Wen, San Jose, CA (US); Richard H. Larson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 14/844,212

(22) Filed: Sep. 3, 2015

(65) Prior Publication Data

US 2017/0068575 A1    Mar. 9, 2017

(51) Int. Cl.
*G06F 9/50* (2006.01)
*G06F 12/084* (2016.01)
(Continued)

(52) U.S. Cl.
CPC ........ *G06F 9/5088* (2013.01); *G06F 9/30101* (2013.01); *G06F 9/3828* (2013.01);
(Continued)

(58) Field of Classification Search
CPC ...... G06F 1/3293; G06F 1/329; G06F 1/3203; G06F 9/4856; G06F 12/0831;
(Continued)

(56) References Cited

U.S. PATENT DOCUMENTS 7,281,055 B2 * 10/2007 Glasco .............. G06F 15/17381
                                                       709/217
7,409,506 B2 *  8/2008 Kamigata ............... G06F 9/526
                                                       710/260
(Continued)

FOREIGN PATENT DOCUMENTS

EP          278474 A2    10/2014
TW      201418972 A       5/2014
(Continued)

OTHER PUBLICATIONS

U.S. Appl. No. 14/548,872, filed Nov. 20, 2014, Williamson et al.
(Continued)

*Primary Examiner* — Jaweed A Abbaszadeh
*Assistant Examiner* — Brian J Corcoran
(74) *Attorney, Agent, or Firm* — Meyertons, Hood, Kivlin, Kowert & Goetzel, P.C.; Lawrence J. Merkel

(57) ABSTRACT

In an embodiment, an integrated circuit may include one or more processors. Each processor may include multiple processor cores, and each core has a different design/implementation and performance level. The processor may support multiple processor states (PStates). Each PState may specify an operating point (e.g. a combination of supply voltage magnitude and clock frequency), and each PState may be mapped to one of the processor cores. During operation, one of the cores is active: the core to which the current PState is mapped. If a new PState is selected and is mapped to a different core, the processor may automatically context switch the processor state to the newly-selected core and may begin execution on that core. The context switch may be performed using a special purpose register (SPR) interconnect. Each processor core in a given processor may be coupled to the SPR interconnect to permit access to the external SPRs.

20 Claims, 9 Drawing Sheets

(51) Int. Cl.
*G06F 9/30* (2018.01)
*G06F 9/38* (2018.01)
*G06F 12/0813* (2016.01)

(52) U.S. Cl.
CPC ........ *G06F 12/084* (2013.01); *G06F 12/0813* (2013.01); *G06F 2212/1028* (2013.01); *G06F 2212/314* (2013.01); *Y02B 60/1225* (2013.01)

(58) Field of Classification Search
CPC .... G06F 1/3206; G06F 1/3275; G06F 1/3287; G06F 9/3891; G06F 15/7807; Y02B 60/142; Y02B 60/121; Y02B 60/1225; Y02B 60/1228; Y02B 60/1282; Y02B 60/32
See application file for complete search history.

(56) References Cited

U.S. PATENT DOCUMENTS

| | | | |
|---|---|---|---|
| 7,624,250 | B2 | 11/2009 | Lau et al. |
| 8,301,932 | B2* | 10/2012 | Hay .............. G06F 5/10 713/400 |
| 8,533,505 | B2 | 9/2013 | Greenhalgh |
| 8,751,833 | B2 | 6/2014 | Hill |
| 8,793,686 | B2 | 7/2014 | Aasheim |
| 8,819,686 | B2 | 8/2014 | Memik et al. |
| 2006/0005200 | A1 | 1/2006 | Vega et al. |
| 2008/0263324 | A1 | 10/2008 | Sutardja |
| 2008/0276026 | A1 | 11/2008 | Branover |
| 2008/0307422 | A1* | 12/2008 | Kurland .............. G06F 15/7842 718/102 |
| 2009/0172713 | A1 | 7/2009 | Kim |
| 2011/0213934 | A1 | 9/2011 | Greenhalgh |
| 2011/0213935 | A1* | 9/2011 | Greenhalgh .......... G06F 1/3203 711/146 |
| 2011/0265090 | A1 | 10/2011 | Moyer et al. |
| 2011/0271126 | A1* | 11/2011 | Hill .............. G06F 1/3203 713/320 |
| 2012/0233477 | A1* | 9/2012 | Wu .............. G06F 1/3287 713/320 |
| 2012/0254877 | A1* | 10/2012 | Comparan .......... G06F 9/30043 718/102 |
| 2013/0061237 | A1 | 3/2013 | Zaarur et al. |
| 2013/0268742 | A1 | 10/2013 | Yamada |
| 2013/0346058 | A1 | 12/2013 | Beckmann |
| 2014/0019723 | A1 | 1/2014 | Yamada |
| 2014/0129808 | A1 | 5/2014 | Naveh et al. |
| 2014/0173311 | A1* | 6/2014 | Park .............. G06F 1/206 713/320 |
| 2014/0196050 | A1 | 7/2014 | Yu |
| 2014/0298060 | A1 | 10/2014 | Hooker |
| 2015/0007196 | A1* | 1/2015 | Toll .............. G06F 9/5083 718/105 |
| 2015/0058650 | A1 | 2/2015 | Varma |
| 2015/0121105 | A1 | 4/2015 | Ahn et al. |
| 2015/0277867 | A1 | 10/2015 | Hasabnis et al. |
| 2015/0281336 | A1 | 10/2015 | Beale |
| 2015/0378417 | A1 | 12/2015 | Lim |
| 2016/0154649 | A1* | 6/2016 | Lin .............. G06F 9/30123 712/228 |

FOREIGN PATENT DOCUMENTS

| | | |
|---|---|---|
| TW | 201437912 A | 10/2014 |
| WO | 2009029643 A2 | 3/2009 |
| WO | 20130036222 A1 | 3/2013 |
| WO | 20130100996 A1 | 7/2013 |
| WO | 20130101069 A1 | 7/2013 |

OTHER PUBLICATIONS

U.S. Appl. No. 14/548,912, filed Nov. 20, 2014, Williamson et al.
"Emulating Asymmetric MPSoCs on the Intel SCC Many-core Processor", Roy Bakker et al., Feb. 2014, 8 pages.
"Benefits of the big.LITTLE Architecture", Hyun-Duk Cho et al., Feb. 2012, Samsung Electronics, 8 pages.
"big.LITTLE Processing", ARM, 4 pages. [accessed Jan. 14, 2014].
"Reflex: Using Low-Power Processors in Smartphones without Knowing Them", Felix Xiaozhu Lin et al., Mar. 3, 2012, 12 pages.
"Variable SMP—A Multi-Core CPU Architecture for Low Power and High Performance", Nvidia, 2011, pp. 1-16. [retrieved Sep. 4, 2015].
"A HW/SW Co-designed Heterogeneous Multi-core Virtual Machine for Energy-Efficient General Purpose Computing", Youfeng Wu et al., Apr. 2, 2011, 10 pages.
"Distributed Thermal Management for Embedded Heterogeneous MPSoCs with Dedicated Hardware Accelerators", Yen-Kuan Wu, et al., Oct. 9, 2011, 7 pages.
Office Action, U.S. Appl. No. 14/548,872, dated Dec. 1, 2016, 20 pages.
Office Action, U.S. Appl. No. 14/548,912, filed Nov. 20, 2014, dated Feb. 1, 2017, 15 pages.
Office Action, U.S. Appl. No. 14/548,912, filed Nov. 20, 2014, dated Sep. 9, 2016, 21 pages.
Office Action, U.S. Appl. No. 14/548,912, dated Sep. 12, 2017, 17 pages.

* cited by examiner

HARDWARE MIGRATION BETWEEN DISSIMILAR CORES

BACKGROUND

Technical Field

Embodiments described herein are related to processors and, more particularly, to multiple processor cores forming a processor.

Description of the Related Art

Various processors are included in electronic systems to execute software providing some amount of user functionality. The processors may include the central processing units (CPUs) in the system, as well as special purpose processors dedicated to specific tasks such as graphics, media processing, etc. Generally, the processors are designed to operate at multiple operating points (settings of supply voltage magnitude and clock frequency). Lower operating points consume less power but also offer limited performance compared to higher operating points. For some workloads, the limited performance is sufficient and the lower operating points can be used. For other workloads, the higher operating points are needed to provide sufficient performance.

In some systems, a wide diversity of workloads are experienced. Designing a processor that can provide the performance needed by the most demanding workloads while also supporting the lowest possible operating point that would provide sufficient performance for many frequently-executed workloads has become a challenge. Processors that operate at high operating points may only support a reduction in supply voltage to a certain level before circuitry ceases to function correctly. Compromises must be made, and typically the lowest operating point is increased until the design can meet the desired high end operating point. As the high end operating points continue to increase, more and more workloads are executable at the lowest operating point (and many could be executed at even lower operating points). Power is expended unnecessarily for such workloads, which can be a critical factor in mobile systems that frequently operate on a limited energy source such as a battery.

SUMMARY

In an embodiment, an integrated circuit may include one or more processors. Each processor may include multiple processor cores, and each core has a different design/implementation and performance level. For example, a core may be implemented for high performance, but may have higher minimum voltage at which it operates correctly. Another core may be implemented at a lower maximum performance, but may be optimized for efficiency and may operate correctly at a lower minimum voltage. The processor may support multiple processor states (PStates). Each PState may specify an operating point (e.g. a combination of supply voltage magnitude and clock frequency), and each PState may be mapped to one of the processor cores. During operation, one of the cores is active: the core to which the current PState is mapped. If a new PState is selected and is mapped to a different core, the processor may automatically context switch the processor state to the newly-selected core and may begin execution on that core.

In an embodiment, the context switch may be performed using a special purpose register (SPR) interconnect. The SPR interconnect may be used in normal operating mode to provide access to SPRs that are external to the processor. For example, in an embodiment, one or more processors may be coupled to a level 2 (L2) cache which may have SPRs. There may be a processor power controller external to the processors, and the processor power controller may have SPRs. Each processor core in a given processor may be coupled to the SPR interconnect to permit access to the external SPRs. This interconnect may be used to perform the context switch. In an embodiment, minimal additional hardware may be required to provide the context switch functionality. For example, no additional buffering beyond that included in the SPR interconnect for normal functionality may be required.

BRIEF DESCRIPTION OF THE DRAWINGS

The following detailed description makes reference to the accompanying drawings, which are now briefly described.

Figure 1:
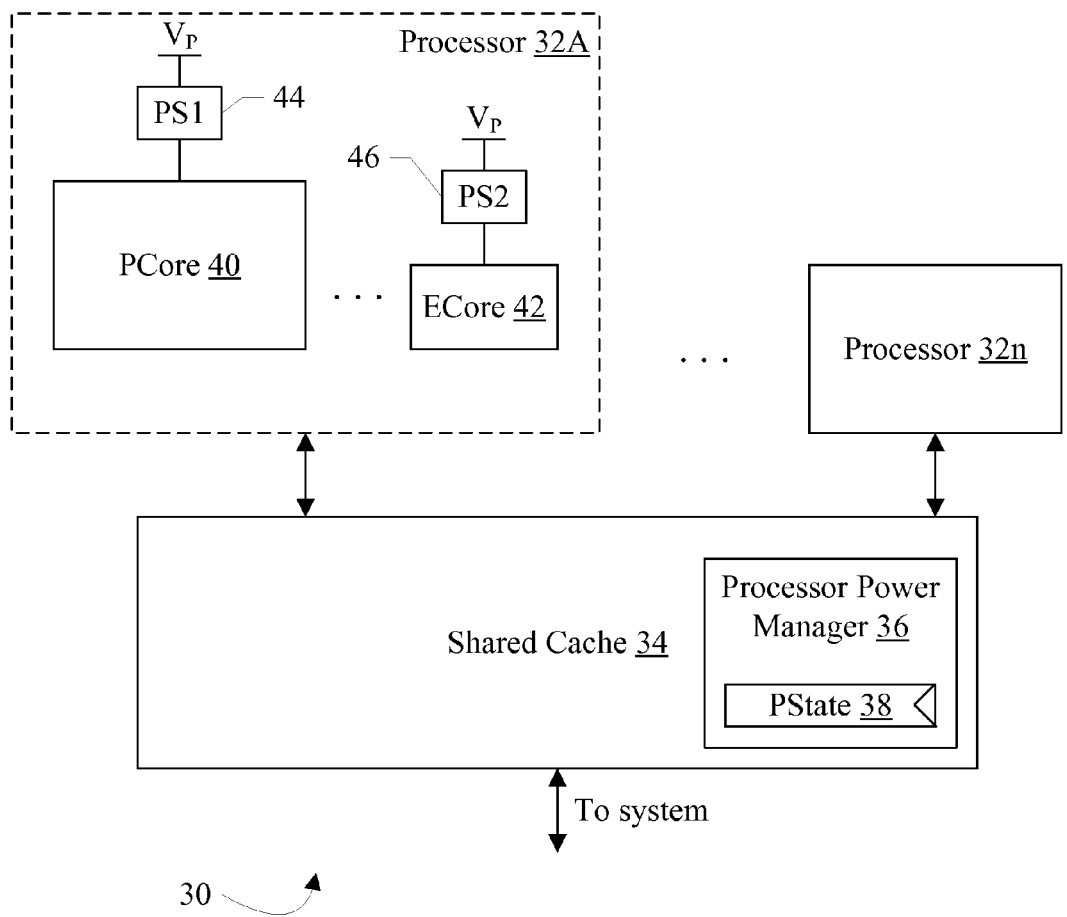
FIG. 1 is a block diagram of one embodiment of a processor cluster.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Processor Overview

FIG. 1 is a block diagram of one embodiment of a processor cluster 30. In the illustrated embodiment, multiple processors 32A-32n and a shared cache 34 are included. The processors 32A-32n are coupled to the shared cache 34, which is further coupled to communicate with other elements of a system that includes the cluster 30. In the illustrated embodiment, the shared cache 34 includes a processor power manager 36 that includes a PState register 38 storing a PState for the processors 32A-32n. Each processor 32A-32n may have its own independent PState, groups of processors 32A-32n may share a PState, or the cluster 30 may have a shared PState for the processors 32A-32n, in various embodiments. Processor 32A is shown in more detail in FIG. 1 to include at least two processor cores, a performance core (PCore) 40 and an efficient core (ECore) 42. Other embodiments may include additional cores. Each core 40 and 42 is coupled to a power supply rail ($V_P$) through respective power switches 44 and 46. Thus, each core 40 and 42 may be independently powered up or down. Other processors, such as processors 32B (not shown) through 32n, may be similar to the processor 32A.

Each processor 32A-32n may be an entity to which software executing in the system may assign code to execute. For example, the software may be part of an operating system (OS) that controls the hardware in the system. The software may be a thread or task scheduler which schedules code to be executed. The OS may also assign a PState to the processors 32A-32n, based on the performance demands of the code being executed. The OS may track the behavior of the code to determine PStates, may statically record information for each thread/task to select a PState, etc., or any combination thereof. In addition or alternatively, the PState may be affected by other conditions in the system (thermal limits, battery power available, etc.).

Each possible PState may specify an operating point for a processor 32A-32n. For example, the operating point may include a supply voltage magnitude for $V_P$ and a clock frequency for the clocks in the processor 32A-32n. Other embodiments may define the operating point in other fashions, but generally the operating point may indicate the performance and power consumption of the processor. In an embodiment, the PState may be a pair of values that are directly used as the supply voltage magnitude and the clock frequency. In other embodiments, the PState may be a value that is used to obtain the supply voltage magnitude and the clock frequency (e.g. an index into a table of values).

As illustrated in FIG. 1, the processor 32A includes the PCore 40 and the ECore 42. Each PState that is supported by the processor 32A is mapped to one of the cores 40 and 42. Each core 40 and 42 may have more than one PState mapped to it.

As the code being executed by a processor 32A-32n changes and/or other system considerations warrant a change in the PState, the PState register 38 may be updated (e.g. by the OS). If the PState is changed from a current PState that is mapped to one of the cores 40 and 42 (the "active core" or the "source core") to a new PState that is mapped to another one of the cores 40 and 42 (the "target core"), the cluster 30 may automatically, in hardware, transfer the processor context of the processor 32A from the active core to the target core. The processor context may include general purpose register (GPR) state and/or special purpose register (SPR) state (collectively "register state"). The general purpose registers may be registers that may be specified as operands of arithmetic/logic instructions, load/store instructions, branch instructions, etc. defined in the instruction set architecture (ISA) implemented by the processor 32A-32n. The general purpose registers may include various operand types such as integer, floating point, vector, etc. Special purpose registers may include various registers storing mode controls for the processor 32A-32n, enabling and disabling various programmable features and features that may be optional and/or in addition to ISA-required features, etc. Special purpose registers may generally be read by a specific SPR read instruction and written by a specific SPR write instruction defined in the ISA, and may generally not be specified as operands of other instructions.

The target core may be powered off at the time the PState is changed. The process of transferring the context may include powering on the target core, resetting and initializing the target core, transferring the processor context, and powering off the active core (making the target core the active core). Execution may continue on the target core (now active core). Accordingly, switching between cores may be invisible to software. In fact, software may not even be "aware" that there are multiple cores in the processor 32A-32n.

In an embodiment, the cores 40 and 42 may have different implementations, but may provide precisely the same program behavior in response to any given instruction stream, including privileged instructions. For example, some instruction set architectures may include features that would uniquely identify a processor in a system. For example, instruction set architectures often have a "CPU ID" instruction that returns a value assigned to the CPU in the system. Each CPU in the system is assigned a unique value. Both cores 40 and 42 may return the same CPU ID value. Another form of the CPU ID instruction may return a value indicating which optional features of the instruction set architecture are implemented by the processor. Both cores 40 and 42 may return the same value for that instruction as well. Various model-specific registers within the SPRs may vary from implementation to implementation. The model-specific register implementation of the cores 40 and 42 may be the same. Thus, the software that executes on the processors 32A-32n, including the operating system software, application software, etc., may operate identically independent of which core 40 or 42 is active.

In another embodiment, there may be some differences between the cores 40 and 42. For example, certain ISA features may be implemented by only one of the cores 40 and 42. If the active core does not implement an ISA feature that is used in currently-executing code, a context transfer to a target core that does implement the ISA feature may be performed. Alternatively, an exception may be signaled and the operating system may activate the correct core or may terminate the code that was being executed. If an exception is used, then the lack of "awareness" of software to the existence of the cores 40 and 42 may be lost.

The PCore 40 and the ECore 42 may be different designs, different implementations of an instruction set architecture (ISA) employed by the processors 32A-32n. Viewed in another way, the PCore 40 and the ECore 42 may implement different microarchitectures. The PCore 40 may be an aggressive design that attempts to maximize performance with power conservation as a less-emphasized design goal. The circuitry in the PCore 40 may be aggressive, which may prevent the minimum supply voltage at which the PCore 40 may operate from being as low as may be desired in some of the PStates. On the other hand, the ECore 42 may implement a more conservative design, and thus may operate correctly at lower minimum voltages than the PCore 40. The performance of the ECore 42 may be lower than the PCore 40 at a given operating point, and power conservation may be a more highly-emphasized goal for the ECore 42. The semiconductor area occupied by the ECore 42 may be less than that of the PCore 40 as well.

While the example illustrated in FIG. 1 includes two cores in the processor 32A, other embodiments may include more than two cores. One core may be the most efficient core operating at the lowest PStates, and other cores may be optimized for other points along the performance/efficiency spectrum until yet another core is the highest performance core of the multiple cores in the processor. Any number of cores may be used in various embodiments.

Generally, a processor may be any circuitry configured to implement the ISA. Various ISAs exist and may be used in various embodiments, such as the x86 architecture (also known as APX), the ARM architecture, the MIPS architecture, PowerPC (now simply Power), etc. A variety of microarchitectural techniques may be employed by the processor, including the multiple core approach described above. Each core may implement various microarchitectural techniques as well. Generally, the microarchitecture may refer to the organization of execution units and other circuitry that is used to implement the ISA. Examples may include in-order versus out-of-order execution, speculative execution, branch prediction, superscalar, superpipelined, etc. Embodiments may implement microcoding techniques in addition to various other techniques.

The processors 32A-32n and/or the processor cluster 30 may be used as any processors in a system. For example, the processors may be central processing units (CPU) that execute the OS to control other hardware in the system and schedule application code to be executed. The CPU may execute the application code as well, etc. The processors may be special purpose processors such as graphics processing units (GPU) optimized for graphics manipulations, digital signal processors (DSPs) optimized for signal processing, embedded processors performing software execution in various peripheral components, etc.

In an embodiment, at most one of the cores 40 and 42 forming a processor 32A-32n may be powered on during execution, except for times when the processor context is being transferred. A given processor 32A-32n may be completely off (all cores powered down). The processor power manager 36 may be configured to control the powering on/up of the processor cores and powering off/down of the processor cores using the power switches 44 and 46.

In some embodiments, the cores 40 and/or 42 may implement data caches that may store modified data (i.e. data that has been written in the cache, e.g. responsive to stores in the processor code being executed, but that has not been written to memory yet such that the data in memory is no longer the correct data). In addition to transferring processor context, the modified data may be flushed from the data cache. Particularly, the data may be flushed to the shared cache 34, but may remain stored in the shared cache 34 unless normal operation of the shared cache 34 causes the data to be evicted. Once the newly-active core is executing, modified data may be a hit in the shared cache 34 and may be moved into the newly-active core's cache with relatively low latency. In other embodiments, there may not be a shared cache and the flushed data may be written to main memory and read from main memory by the newly-active core as needed.

The processor power manager 36 may be configured to manage PState transitions within the processor cluster 30. The processor power manager 36 may be configured to communicate supply voltage magnitude transitions to a system level power manager or directly to a power management unit (PMU) that supplies the voltages to the system. The processor power manager 36 may be configured to interact with the clock generation hardware (not shown in FIG. 1) such as a phase lock loop (PLL) or the like.

The shared cache 34 may have any capacity and configuration. The shared cache 34 may be inclusive of caches in the processors 32A-32n, exclusive of the caches, or non-inclusive.

Figure 2:
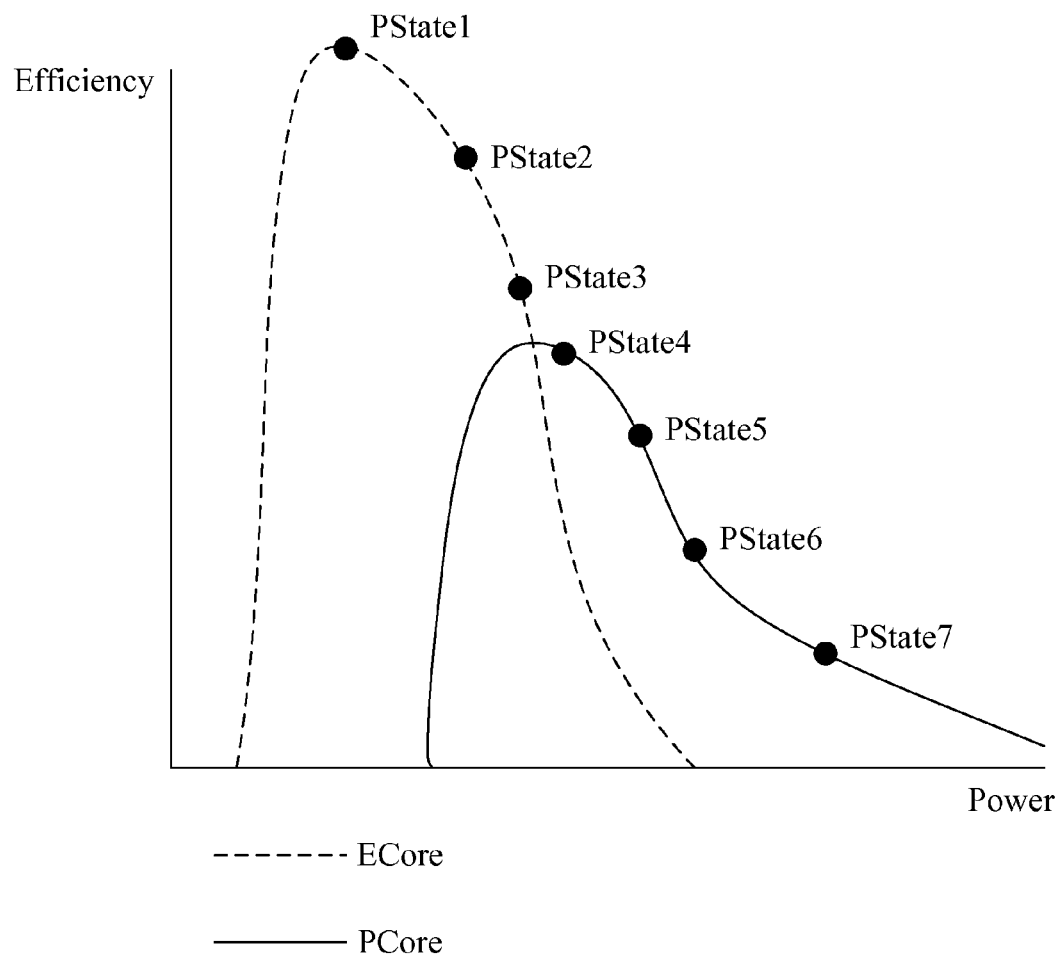
FIG. 2 is a graph illustrating efficiency versus performance for a PCore and an ECore as illustrated in FIG. 1 for one embodiment.

FIG. 2 is a graph illustrating efficiency versus power for one embodiment of the cores 40 and 42. The dotted curve corresponds to the ECore 42 and the solid line corresponds to the PCore 40. Efficiency is graphed on the vertical axis and power on the horizontal axis. Efficiency may be measured in a variety of ways (e.g. performance/watt). The performance portion of the efficiency measurement may be measured using various benchmark programs such as Specint, SpecFlt, Dhrystone, etc. Various PStates for the processor 32A are illustrated along the curves in FIG. 2. PStates that corresponding to higher performance are on the PCore curve, since the PCore is optimized for performance, wherein the PStates corresponding to lower performance/higher energy conservation are on the ECore curve, which is more efficient at lower performance levels but less performant at higher performance levels.

Accordingly, in the example of FIG. 2, the PStates 1, 2, and 3 are mapped to the ECore 42 and the PStates 4, 5, 6, and 7 are mapped to the PCore 40. Any number of PStates may be supported and any number may be mapped to various cores. In another embodiment, continuous PState settings may be supported. In such an embodiment, a break over point where the curves intersect in FIG. 2 may be defined at which a core swap may occur. In general, each core may have a subset of the PStates mapped to that core, and the subsets may be non-overlapping.

Figure 3:
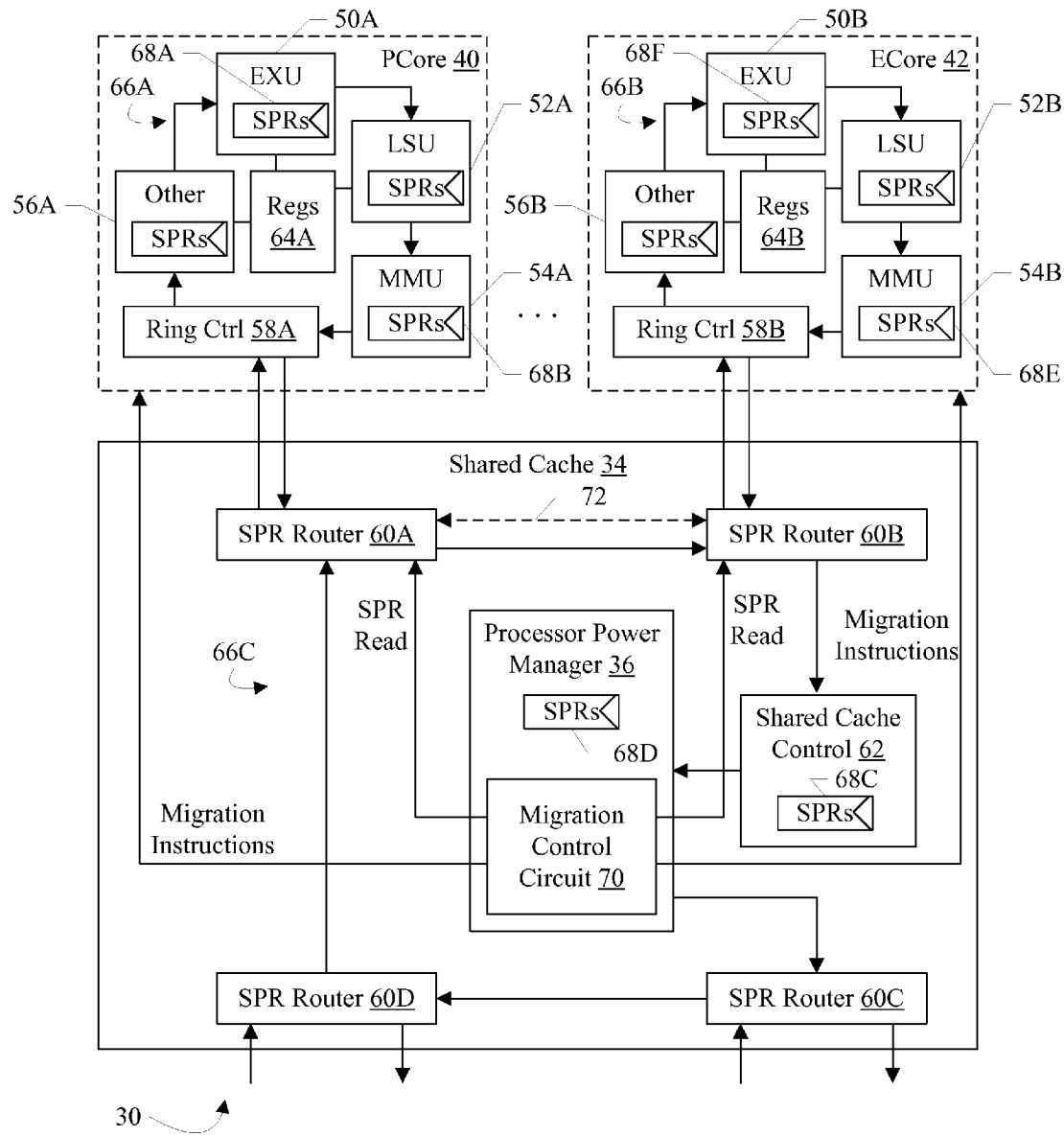
FIG. 3 is a block diagram of one embodiment of a processor cluster shown in greater detail.

FIG. 3 is a block diagram illustrating the cluster 30 in greater detail for one embodiment. In the illustrated embodiment, each of the PCore 40 and the ECore 42 are illustrated as including various circuits such as an execution units (EXUs) 50A-50B, load/store units (LSUs) 52A-52B, memory management units 54A-54B, and other blocks 56A-56B. The EXU 50A, the LSU 52A, the MMU 54A, and the other blocks 56A maybe coupled to an SPR interconnect 66A indicated by the arrows between units 50A-56A in FIG. 3 along with a control circuit 58A. In the illustrated embodiment, a ring interconnect is used (or a daisy chain) to pass SPR read/write operations around to the units 50A-56A. Other embodiments may use any interconnect. Generally, the SPR interconnect may be dedicated to SPR communication. Other interconnection among the units 50A-56A may be provided for normal operation (i.e. ISA instruction execution). Such interconnection is not shown in FIG. 3. Similarly, the units 50B-56B may be coupled in an SPR interconnect (ring) 66B with control circuit 58B. The SPR ring within each core 40 or 42 may be referred to as a local SPR ring within the core. The control circuits 58A-58B may also be coupled to a global SPR ring 66C via SPR routers 60A-60B in FIG. 3, respectively. Other SPR routers 60C-60D may be coupled to the global SPR ring to couple other cores (e.g. cores within the processor 32n in FIG. 1). Additionally, components within the shared cache 34 such as an shared cache control circuit 62 and the processor power manager 36 may be coupled to the global SPR ring. The general purpose registers for each core are illustrated as registers 64A-64B, coupled to units that execute instruction operations in the cores 40 and 42, respectively (e.g. the EXUs 50A-50B, the LSUs 52A-52B, and possibly one or more of the other blocks 56A-56B).

Various units in the cores 40 and 42 and the shared cache 32 may include one or more SPRs that control operation of the units. For example, SPRs 68A are shown in EXU 50A and SPRs 68B are shown in MMU 54A. Similarly, SPRs 68F are shown in EXU 50B and SPRs 68E are shown in MMU 54B. Other SPRs in the cores 40-42 are not explicitly numbered to maintain simplicity in the drawings. The processor power manager 36 and the shared cache control circuit 62 may also include SPRs 68C-68D, accessible by SPR read/write instructions executed by a core 40 or 42 via communication over the local and global SPR rings. Generally, the SPRs in the cluster 30 may be accessible via SPR addresses generated during execution of the SPR read/write instructions. The addresses may be register numbers, similar to the manner in which GPRs are addressed. Alternatively, a larger address space may be assigned to SPRs and the SPR addresses may be allocated in the space as desired. There may be "holes" in the space which do not map to SPRs.

An EXU 50A-50B may be configured to execute an SPR read/write operation. The EXU 50A-50B may issue an SPR command on the SPR ring 66A-66B in response to the SPR read/write operation. The SPR command may include the SPR address. Each circuit on the SPR ring 66A-66B may decode the SPR address to determine if the command is targeted at an SPR in the circuit. If an SPR in the circuit is targeted, the circuit may transmit a response in place of the SPR command on the SPR ring 66A-66B. If no SPR in the circuit is targeted, the circuit may forward the SPR command on the SPR ring 66A-66B. The ring control circuits 58A-58B may decode the SPR address to detect SPRs that are external to the cores 40-42, and may forward SPR commands to the SPR ring 66C when external SPRs are addressed. The SPR routers 60A-60D may detect SPR responses that address SPRs in the cores 40-42, and may route the responses to the ring control circuits 58A-58B in response.

The SPRs 68C-68D may be shared among the cores 40 and 42 (i.e. an access to one of the SPRs 68C-68D by either core may result in access to the SPR 68C-68D over the global SPR ring 66C). However, SPRs in the cores 40 and 42 may need to be migrated from one core to the other as part of a context transfer. Similarly, the registers 64A-64B may need to be migrated from one core to another as part of the context transfer. The SPR interconnect 66A-66C may be used to perform the transfer. More particularly, when a new PState is written to the PState register 38, a migration control circuit 70 may cause the transfer of GPR state and SPR state from the active core 40 or 42 (the source core for the transfer) and the target core 42 or 40 over the SPR interconnect.

In an embodiment, an SPR address that is otherwise not in use may be defined as a "virtual SPR." The SPR may be a target for writes of each GPR from the source core, causing the register data to be transferred onto the SPR interconnect. The ring control circuits 58A-58B may detect the virtual SPR address as an external address and may route the writes out to the global SPR ring 66C, so that the register data may be transmitted to the target core. The SPR routers 60A-60D may detect the virtual SPR address and may route the data to the target core as a read response, which may provide the data to the SPR read instructions previously injected into the target core and thus result in the data being written to the register in the target core.

In addition to transferring the GPR register state, at least some of the SPR state from the source core may be transferred to the target core. All of the SPR state may be transferred, or a subset of the SPR state that excludes one or more SPRs may be transferred. In an embodiment, SPRs may be identified during the design phase as SPRs to be transferred or not transferred using a "migrate" flag for each SPR. The migration control circuit 70 may be configured to transfer those SPRs indicated by the migrate flag. Alternatively, the subset of SPRs to be transferred may be programmable in the migration control circuit 70. The SPR state may be transferred, in an embodiment, via external SPR read requests transmitted by the SPR router 60A-60B coupled to the source core to read the SPRs from the source core. The corresponding read responses from the source core may be converted into write responses targeted at the target core, updating the SPRs in the target core with the data from the SPRs in the source core. The migration control circuit 70 may be coupled to the SPR routers 60A-60B and may transmit the SPR read requests to the SPR router 60A-60B associated with the source core. The order of the SPR read requests may be the order of the desired migration. The receiving SPR router 60A-60B may transmit the read requests to the source core, and may capture the corresponding read responses. The receiving SPR router 60A-60B may convert the captured read responses to write responses and transmit them to the SPR router 60A-60B associated with the target core, which may transmit the write responses to the target core.

The migration control circuit 70 may thus cause a stream of GPR states and SPR states to be transmitted over the SPR interconnect from the source core to the target core. The transfer may make use of the existing SPR interconnect mechanisms, which may limit the amount of additional hardware circuitry employed to make the transfer. For example, even though the cores 40 and 42 may be asynchronous, no additional buffering other than that already included in the SPR interconnect for SPR access may be required. The stream of register data may be transmitted in a particular order, and the register data may be received in the target core in the same order. For example, in an embodiment, the migration control circuit 70 may be configured to transmit migration instructions to the cores 40 and 42 to cause the migration. The source core may receive source instructions which write the GPRs to the virtual SPR address in a particular order, and the target core may receive target instructions which ready the virtual SPR into the GPRs in the same particular order.

In an embodiment, additional interconnect may be provided between the SPR routers 60A-60B to facilitate context transfer (e.g. buses 72 illustrated in FIG. 3). The buses 72 may improve performance of the context transfer, for example in cases in which multiple PCores and ECores are included in a cluster and migration may occur in parallel between different PCores and corresponding ECores. In an embodiment, the buses 72 may also permit the global SPR ring 66C to be available for external SPR commands to monitor and/or control migration. Additionally, the buses 72 may permit context transfer from the ECore 42 as the source core to the PCore 40 as the target core to proceed over the buses 72 rather than around the global SPR ring 66C through the cache control circuit 62, the processor power manager 36, etc., which may reduce latency. Additional interconnect (not shown in FIG. 3) may also be provided between other SPR routers that are coupled to PCore/ECore pairs (e.g. the SPR routers 60C-60D) to facilitate context transfers in a similar fashion.

The various circuit blocks included in the cores 40 and 42, when taken together, may implement the execution of instructions from the ISA. Any set of circuit blocks may be included, and any number of a given block may be included in a core, in various embodiments. The EXUs 50A-50B may include circuitry to execute various arithmetic/logic operations, for example. There may be different EXUs for different operand types, and there may be different numbers of EXUs for different operand types (e.g. integer, floating point, vector, etc.). The LSU 52A-52B may include circuitry to execute load and store operations, interfacing with cache/memory, enforcing ordering rules, etc. In embodiments that implement address translation, the MMUs 54A-54B may include circuitry to manage the virtual to physical address translations, such as translation lookaside buffers (TLBs), table walk circuitry, etc. The other blocks 56A-56B may implement any other microarchitectural features (e.g. caches, fetch control circuitry, branch prediction circuitry, decoders, etc.).

In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op." Thus, the EXUs 50A-50B, the LSUs 52A-52B, and various other hardware in the cores 40 and 42 may be configured to execute instruction operations that are derived from the instructions fetched by the cores 40 and 42 (or inserted by the migration control circuit 70).

The ring control circuits 58A-58B may be configured to manage data flow around the local SPR rings 66A-66B and interfacing with the global SPR ring 66C via the SPR routers 60A-60B. The ring control circuits 58A-58B may, for example, detect SPR read/write operation on the local SPR ring 66A-66C that access SPRs on the global SPR ring 66C, and may transmit such operations to the SPR routers 60A-60B. The ring control circuits 58A-58B may also receive SPR read/write operations and responses from the SPR routers 60A-60B and may route such operations to the target SPRs on the local SPR ring 66A-66B. The ring control circuits 58A-58B may also be configured to detect the virtual SPR address for register state transmission and may route the corresponding operations on to the global SPR ring 66C.

The SPR routers 60A-60D, along with the shared cache control circuit 62 and the processor power manager 36, may form the global SPR ring 66C. As mentioned above, the SPR routers 60A-60D may be configured to capture SPR operations from the global SPR ring 66C for routing locally in a core, and may insert operations provided from a core onto the global SPR ring 66C. The shared cache control circuit 62 may generally include the circuitry for caching data in the shared cache 34.

Figure 4:
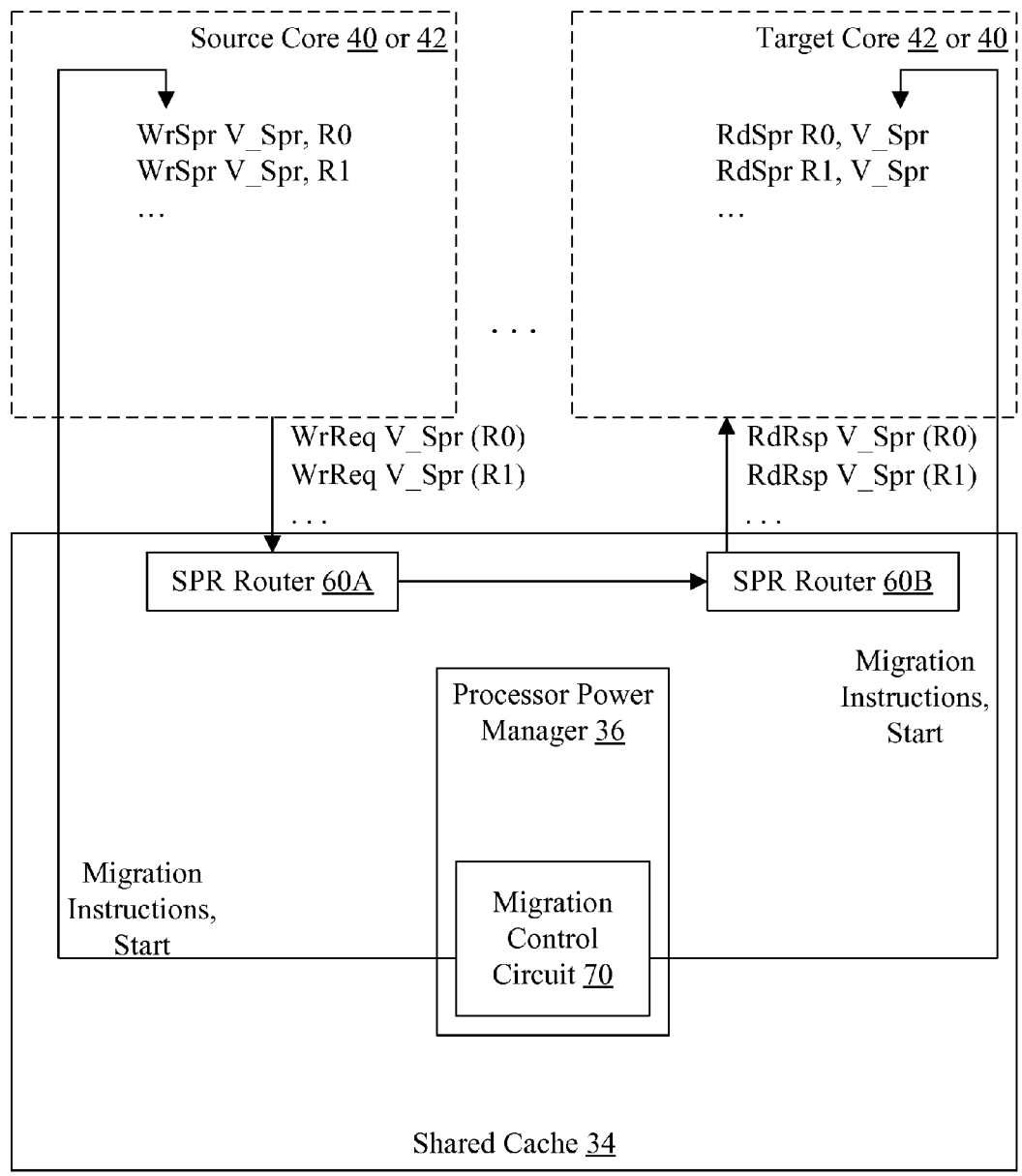
FIG. 4 is a block diagram of a portion of the embodiment of FIG. 3 illustrating instruction injection into the processor cores to transfer general purpose register (GPR) state.

FIG. 4 is a block diagram illustrating a source core 40 or 42, a target core 42 or 40, and the SPR routers 60A-60B performing a transfer of register state for one embodiment. In the illustrated embodiment, instruction sequences for both the source core and the target core provided by the migration control circuit 70 is shown. The instructions may be provided in any fashion. For example, the cores may be triggered to fetch from a given address to which the migration control circuit 70 may respond with the instructions. Alternatively, the migration control circuit 70 may be configured to inject the instructions into the core's pipelines (e.g. at the output of the instruction cache, at a decode stage, directly into execution units, etc.).

FIG. 4 is an example of instruction injection into the cores 40 and 42 to transfer register state. In the illustrated embodiment, the source core's code sequence includes an SPR write instruction (WrSpr) to the virtual SPR address (V_Spr) for each general purpose register in the core (e.g. R0, R1, etc.). Since the writes are all to the same SPR, the dependency checking logic of the source core should prevent out of order execution even if the source core is designed to perform out of order execution. Thus, a predictable stream of register values may be provided over the SPR interface to the target core. In response to the SPR write instructions, the source core may transmit SPR write requests (WrReq in FIG. 4) to the SPR 60A, which may transmit them to the SPR router 60B. The SPR router 60B may convert the write requests to read responses (RdRsp in FIG. 4). Alternatively, write requests may be converted to read responses by the SPR router 60A and then transmitted to the SPR router 60B. The target core's instruction sequence includes a series of SPR read instructions (RdSpr), each reading the V_Spr address and writing the result into a GPR. The order of the GPRs in the instructions in the target core may be the same as the order in the source core. Since all the instructions depend on the same source operation V_Spr, each instruction is ready to execute at the same time. Scheduling logic that schedules the oldest instruction first may ensure the instructions stay in order. Each RdSpr instruction may be matched with a corresponding read response from the SPR router 60B, completing the transfer. Thus, the stream of GPR values may be provided from the source core to the target core.

In addition to transmitting instructions to the cores for performing the register state transfer, the migration control circuit 70 may also concurrently transmit a start signal to the source and target cores, so that they start at approximately the same time. There may be a few clock cycles of uncertainty due to synchronization of the start signals into the cores, but there may be enough flexibility in the SPR interconnect to handle the uncertainty since the same uncertainty may exist when reading/writing SPRs 68C-68D from either core 40 or 42.

Figure 5:
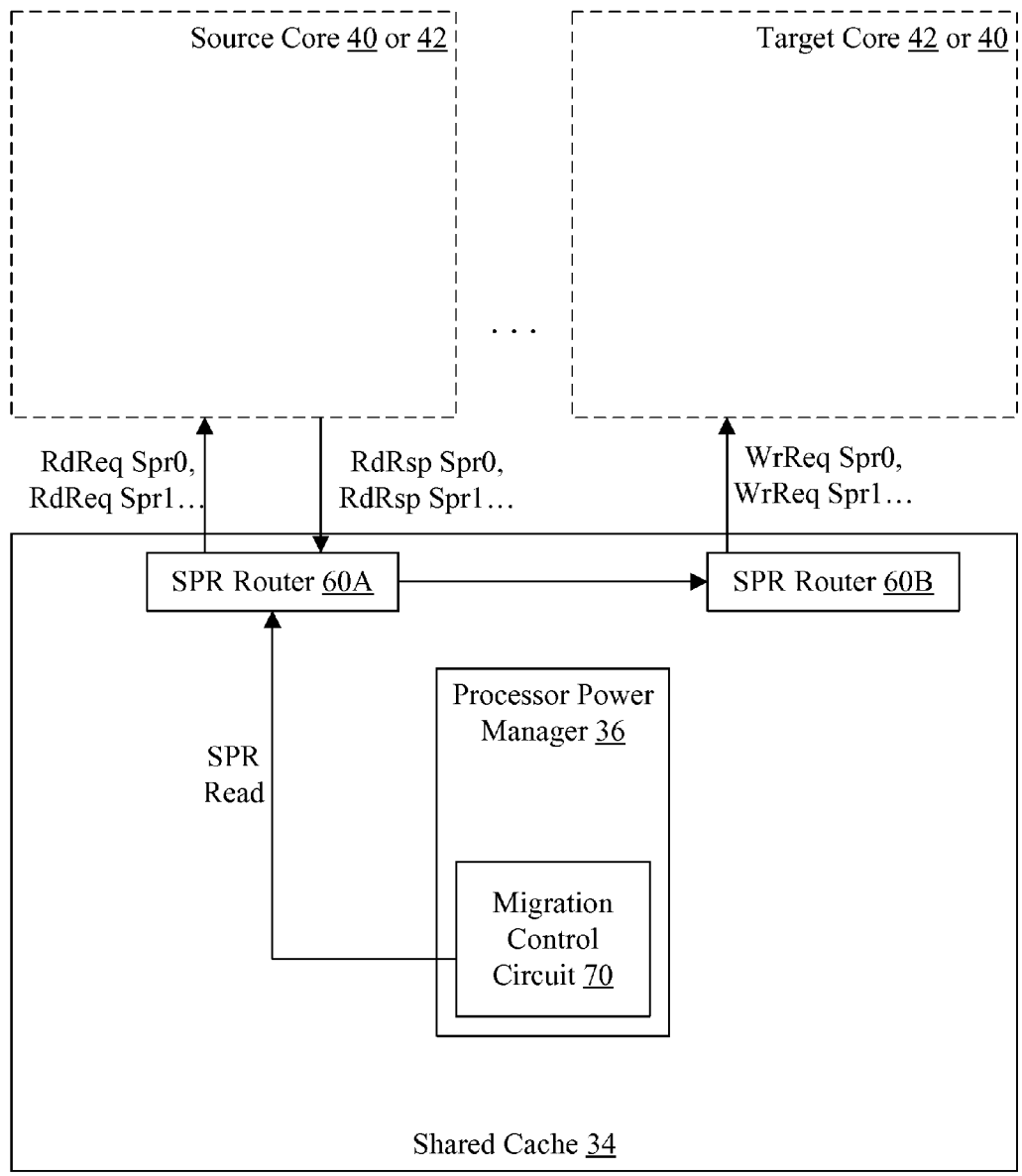
FIG. 5 is a block diagram of a portion of the embodiment of FIG. 3 illustrating special purpose register (SPR) transfer.

FIG. 5 is an example of using external SPR read and write requests to transfer SPR state. The migration control circuit may be configured to transmit the SPR read requests to the SPR router 60A-60B coupled to the source core. The SPR router may transmit the read requests to the source core (RdReq Spr0, RdReq Spr1, etc. in FIG. 5). The source core may read the SPR contents and transmit the data in read responses to the SPR router 60A-60B (RdRsp Spr0, RdRsp Spr1, etc.). The SPR router 60A-60B coupled to the source core may capture the read responses and convert them to write requests (WrReq in FIG. 5) targeted at the target core. The SPR routers 60A-60B may route the converted write requests to the targeted SPR in the target core.

In an embodiment, processor state other than GPRs and SPRs may be migrated as well. After transferring some of the GPRs, but the transferred GPRs in the source core may be used as temporary storage. Instructions may be injected to read the other processor state (e.g. flags, etc.) into the transferred GPR. The data may be transferred to the target core (to one of the GPRs that has not yet been transferred) via the V_Spr mechanism described above. Instructions may be injected in the target core to move the GPR data to the corresponding location in the target core. Remaining GPR state may then be transferred.

It is noted that, while the migration control circuit 70 is shown as a single block in the shared cache 34, the migration control circuit 70 may include circuitry located within each core as well as circuitry outside the cores (e.g. in the shared cache 34 as shown).

Figure 6:
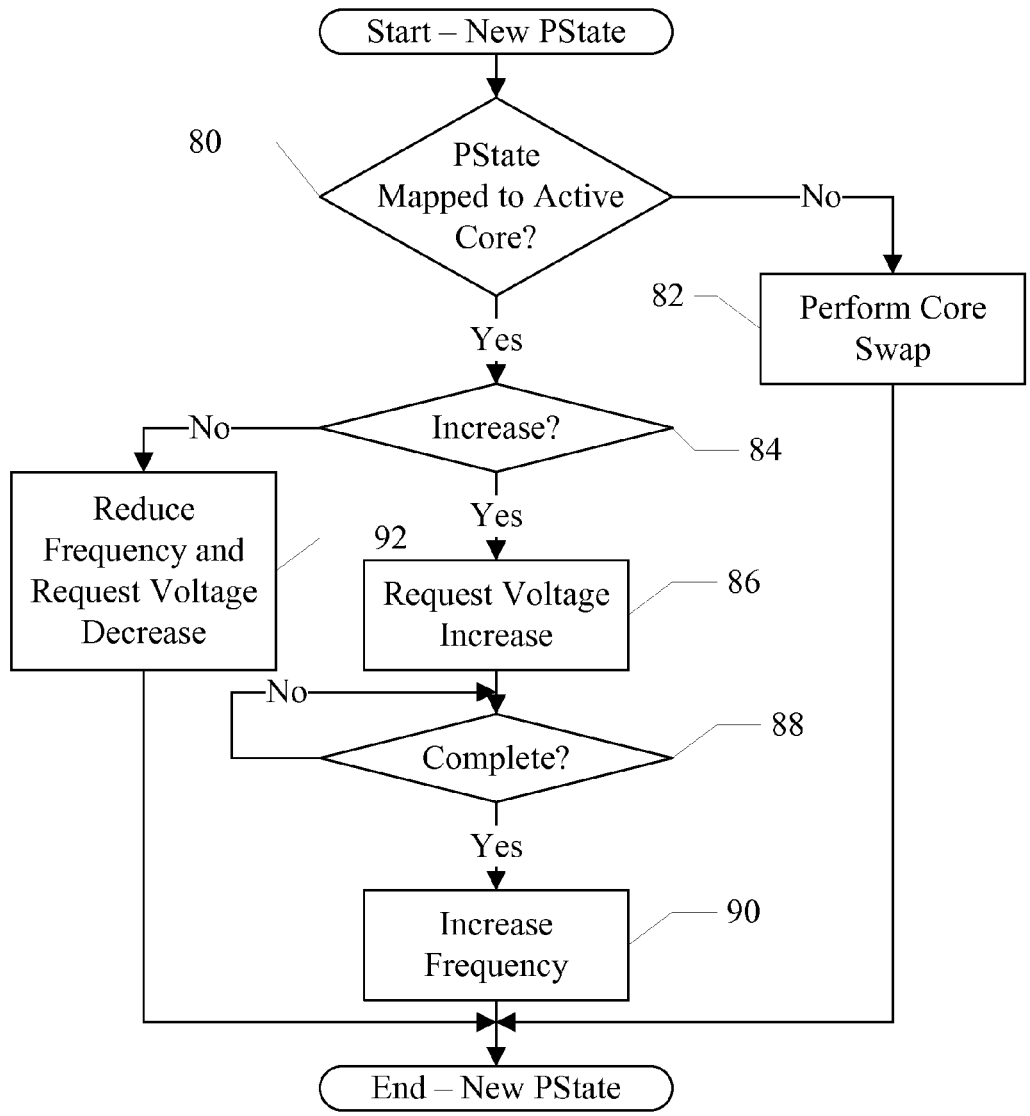
FIG. 6 is a flowchart illustrating operation of one embodiment of a migration control circuit to change processor states.

FIG. 6 is a flowchart illustrating one embodiment of operation of the processor power manager 36 in response to a new PState written to the PState register 38. While the blocks are shown in a particular order for ease of understanding, other orders may be used. Blocks may be performed in parallel in combinatorial logic in the processor power manager 36. Blocks, combinations of blocks, and/or the flowchart as a whole may be pipelined over multiple clock cycles. The processor power state manager 36 may be configured to implement the operation shown in FIG. 6.

The active core may be the core 40/42 which is currently executing code. In some embodiments, the active core may be the only core that is powered on during steady state operation at the current PState. If the new PState is not mapped to the active core (decision block 80, "no" leg), the processor power state manager 36 may perform a "core swap" to the core to which the new PState is mapped (block 82). If the new PState is mapped to the active core (decision block 80, "yes" leg), the active core may remain active and execution may continue while the PState is changed. If the new PState is an increase from the current PState (decision block 84, "yes" leg), the supply voltage magnitude may be increased first to support the increased frequency. Thus, the processor power state manager 36 may request the voltage increase (block 86) and wait for the voltage increase to complete (decision block 88, "yes" leg). The processor power state manager 36 may determine that voltage increase is complete by waiting for a specified period of time, or may receive a communication that indicates when the voltage increase is complete. In an embodiment, the processor power state manager 36 may transmit the voltage increase request to another power manager (e.g. an SOC level power manager shown in FIG. 8, in one embodiment) or may transmit the voltage request directly to a PMU that supplies the voltage. Once the voltage increase is complete, the processor power manager 36 may increase the frequency of the clock (block 90). On the other hand, if the new PState is a decrease from the current PState, the current supply voltage may support the new (lower) frequency. Thus (decision block 94, "no" leg), the processor power manager 36 may update the clock frequency and request the new supply voltage without waiting for the voltage change to complete (block 92).

Figure 7:
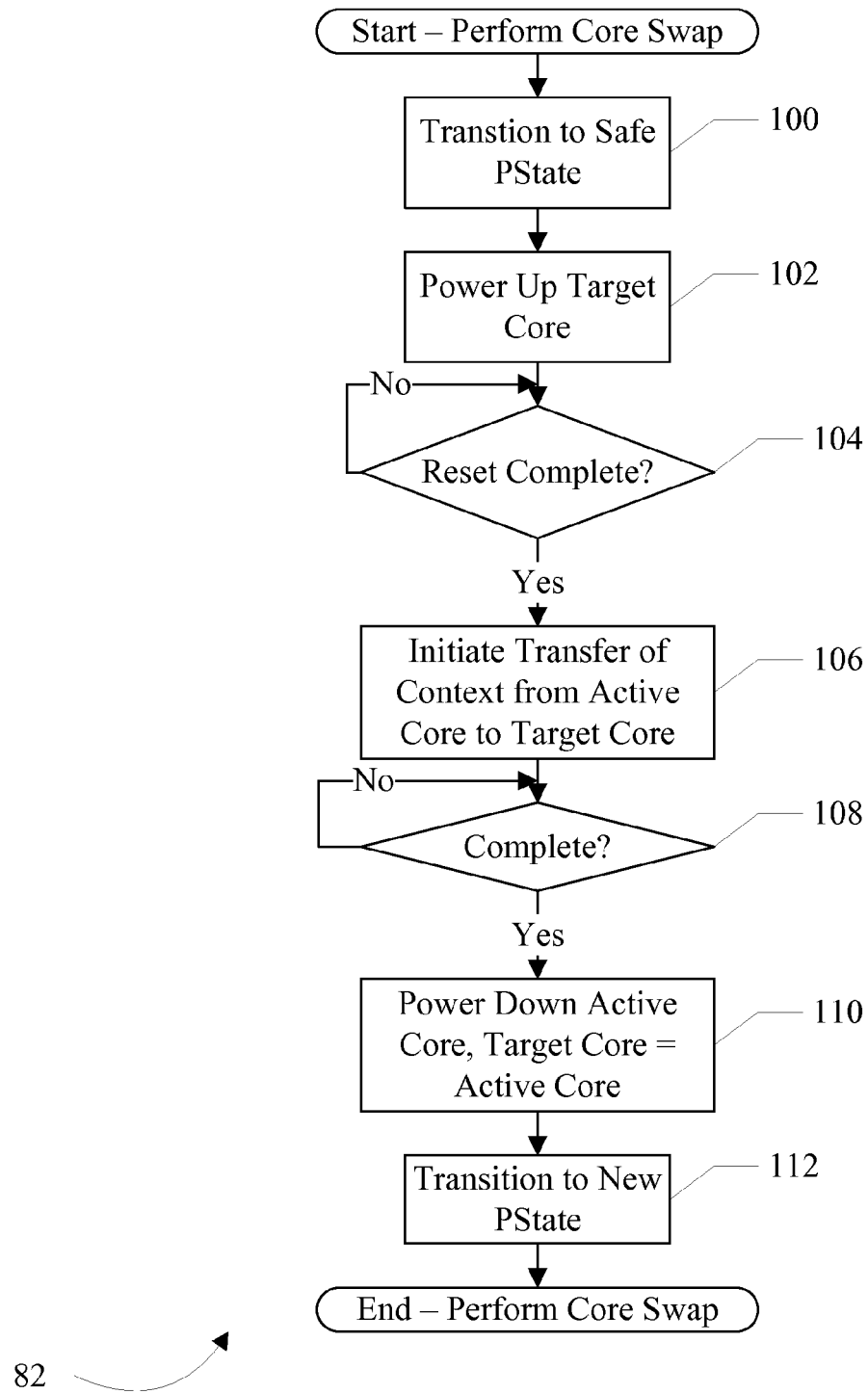
FIG. 7 is a flowchart illustrating operation of one embodiment of the migration control circuit to swap cores.

FIG. 7 is a flowchart illustrating one embodiment of operation of the processor power manager 36 to perform a core swap (block 82 from FIG. 6). While the blocks are shown in a particular order for ease of understanding, other orders may be used. Blocks may be performed in parallel in combinatorial logic in the processor power manager 36. Blocks, combinations of blocks, and/or the flowchart as a whole may be pipelined over multiple clock cycles. The processor power state manager 36 may be configured to implement the operation shown in FIG. 7.

The processor power manager 36 may transition the active core to a "safe" PState (block 100). The safe PState may be a state at which both the active core and the target core operate correctly. In this context, the target core may be the core to which the new PState is mapped. In embodiments in which there are more than two cores, the safe PState may be different depending on which cores are the active and target cores. The safe PState need not be a PState that is selectable in the PState register 38. That is, the combination of supply voltage and frequency may not be one of the supported combinations that are mapped to the cores. For example, the PCore may be capable of running at a higher frequency given the supply voltage magnitude in the safe PState. However, the ECore may not be capable of running at the higher frequency with the given supply voltage magnitude. Thus, a safe PState could include the current supply voltage magnitude but a lower clock frequency. Alternatively, the target core may not support the current supply voltage, and the safe PState may include different supply voltage magnitude and clock frequency. Transitioning to the safe PState may be similar to blocks 84, 86, 88, 90, and 92 in FIG. 6. The processor power manager 36 may also quiesce the active core to stop instruction execution.

The processor power manager 36 may power up the target core (block 102). For example, in the embodiment of FIG. 1, the processor power manager 36 may close the power switches to the target core, allowing power to flow to the target core. The target core may be reset after power has stabilized. In some embodiments, the target core may initialize after reset is complete. Once reset (and initialization, if applicable) is complete (decision block 104, "yes" leg), the processor power manager 36 may initiate a transfer of the processor context from the active core to the target core (block 106). More particularly, the migration control circuit 70 may initiate the transfer of processor state from the source core to the target core. In an embodiment, the cores may include circuitry configured to transmit/receive the processor context. In another embodiment, the circuitry may be in the migration control circuit 70 and/or in instructions transmitted by the migration control circuit 70 to the cores. As mentioned previously, the cores may also be configured to flush the caches during the context transfer. Once the context transfer is complete (decision block 108, "yes" leg), the processor power manager may power down the (previously) active core and the target core may become the active core (block 110). The powering down may be accomplished, e.g. by opening the power switches to the previously active core. The processor power manager 36 may transition the active core to the new PState (block 112). Transitioning to the new PState may be similar to blocks 84, 86, 88, 90, and 92 in FIG. 6.

Figure 8:
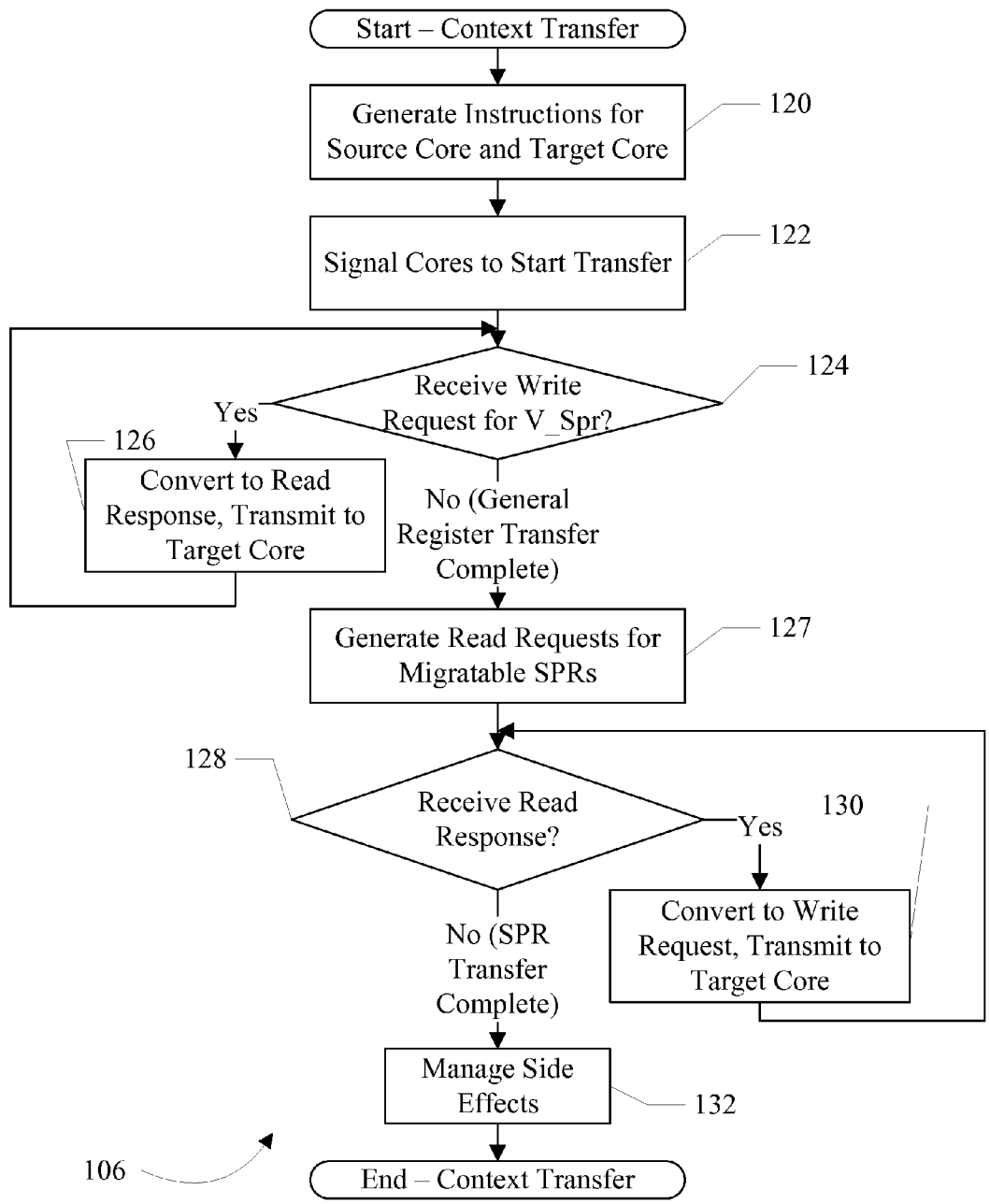
FIG. 8 is a flowchart illustrating operation of one embodiment of the migration control circuit to transfer context between cores.

FIG. 8 is a flowchart illustrating one embodiment of operation of the migration control circuit 70 and the SPR routers 60A-60D and ring control circuits 58A-58B to transfer processor context or state (block 106 from FIG. 7). While the blocks are shown in a particular order for ease of understanding, other orders may be used. Blocks may be performed in parallel in combinatorial logic in the control circuit 70, the SPR routers 60A-60D, and/or the ring control circuits 58A-58B. Blocks, combinations of blocks, and/or the flowchart as a whole may be pipelined over multiple clock cycles. The above circuitry may be configured to implement the operation shown in FIG. 8.

The migration control circuit 70 may generate the instructions for the source core and the target core (block 120). At least some of the instructions for the beginning of each sequence (source and target) may be generated, although subsequent instruction generation may overlap the other operations illustrated in FIG. 8. Instruction generation may be performed via state machine, reading a table of instructions from a memory such as a read-only memory (ROM), Flash memory, or random access memory (RAM), etc. When at least enough instructions have been generated to keep the cores' pipelines busy, the migration control circuit 70 may signal the cores to start the transfer (block 122). The ring control circuit 58A-58B in the source core may detect each write request to the V_Spr address and may route the write request to SPR routers 60A-60B. The SPR routers 60A-60B may convert the write requests to read responses and may transmit the read responses to the target core (decision block 124, "yes" leg and block 126). As discussed above, the SPR routers 60A-60B and/or the ring control circuit 58A-58B in the target core may convert the SPR writes to read responses in the target core, providing the register data to be written to the target registers of the RdSpr operations in the target core.

Once the writes to the V_Spr have concluded (and thus the GPR register transfer is complete, decision block 124, "no" leg), migration control circuit 70 may generate the SPR read requests and transmit them to the SPR router 60A-60B coupled to the source core (the "initiating SPR router" block 127). As mentioned previously, in an embodiment, a subset of the SPRs may be migrated and thus the migration control circuit 70 may generate the SPR read requests for migratable SPRs. The initiating SPR router may transmit the SPR read requests to the source core. The ring control circuit 58A-58B in the source core may route each SPR read on the local SPR ring, and may transmit the read response to the initiating SPR router. The initiating SPR router may detect the read response (decision block 128, "yes" leg). The initiating SPR router may capture the read response from the local SPR ring and convert it to a write request to the target core (block 130). The initiating SPR router may route the write request to the target core (via the other SPR router 60A-60B over the buses 72). Alternatively, read responses may be converted to write requests by the other SPR router 60A-60B (coupled to the target core).

After the SPR transfer is complete (decision block 128, "no" leg), the migration control circuit 70 may manage any potential "side effects" of the transfer (block 132). Side effects may be state of the processor that is not in the GPRs and SPRs, but which may need to be retained to provide the behavior expected by the programmer. For example, if the processor is stopped prior to the transfer (e.g. in a wait for event state such as in response to a wait for interrupt (WFI) or wait for event (WFE) instruction), the target core should be in the same wait for event state. If the processor is in a debug mode prior to the transfer, then the target core should be in debug mode. Interrupt state captured by the processor may be preserved.

Figure 9:
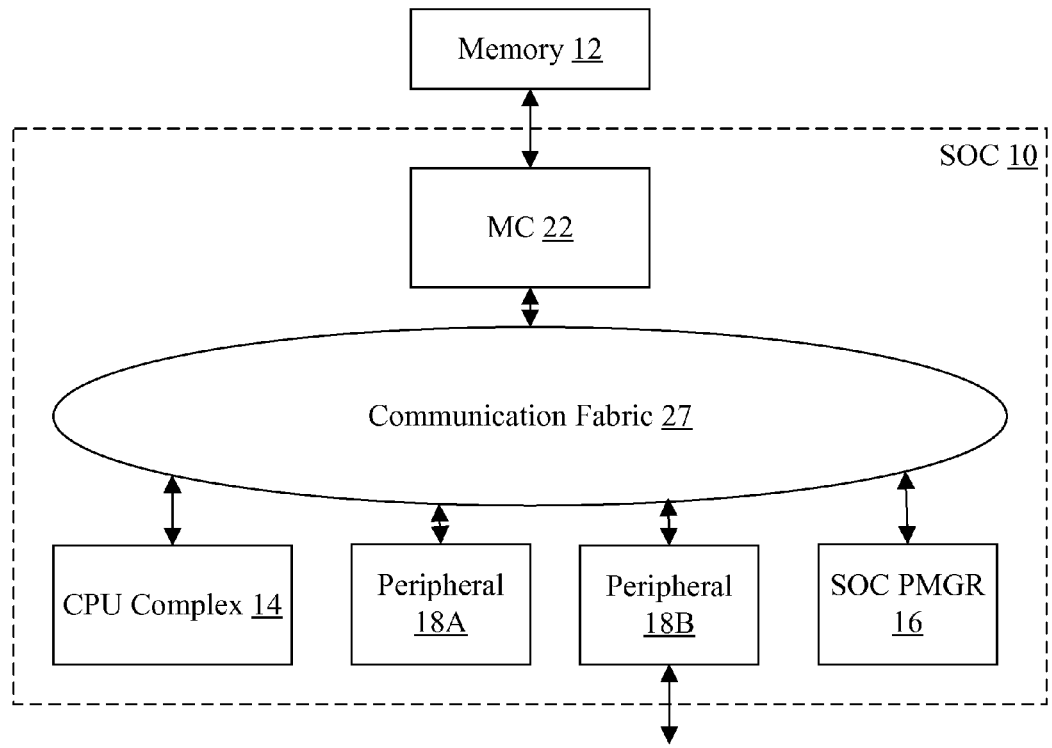
FIG. 9 is a block diagram of one embodiment of a system on a chip (SOC) including one embodiment of the processor cluster shown in FIG. 1.

FIG. 9 is a block diagram of one embodiment of an SOC 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14 (which may be implemented by the processor cluster 30 shown in FIG. 1), peripheral components 18A-18B (more briefly, "peripherals" 18), a memory controller 22, an SOC power manager (PMGR) 16, and a communication fabric 27. The components 14, 16, 18A-18B, and 22 may all be coupled to the communication fabric 27. The memory controller 22 may be coupled to the memory 12 during use.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the shared cache or caches in the processors, which serve only certain components. Additionally, in some embodiments, a system cache need not be located within the memory controller 22.

The peripherals 18A-18B may be any set of additional hardware functionality included in the SOC 10. For example, the peripherals 18A-18B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The SOC PMGR 16 may be configured to control the supply voltage magnitudes requested from the PMU in the system. There may be multiple supply voltages generated by the PMU for the SOC 10. For example, the $V_P$ voltage may be generated for the processors 32A-32n in the CPU complex 14, and a $V_{SOC}$ voltage may be generated for other components in the SOC 10. In an embodiment, $V_{SOC}$ may serve the memory controller 22, the peripherals 18, the SOC PMGR 16, and the other components of the SOC 10 and power gating may be employed based on power domains. There may be multiple supply voltages for the rest of the SOC 10, in some embodiments. In some embodiments, there may also be a memory supply voltage for various memory arrays in the CPU complex 14 and/or the SOC 10. The memory supply voltage may be used with the voltage supplied to the logic circuitry (e.g. $V_P$ or $V_{SOC}$), which may have a lower voltage magnitude than that required to ensure robust memory operation. The SOC PMGR 16 may be under direct software control (e.g. software may directly request the power up and/or power down of components) and/or may be configured to monitor the SOC 10 and determine when various components are to be powered up or powered down. For the CPU complex 14, the voltage requests for $V_P$ may be provided to the SOC PMGR 16, which may communicate the requests to the PMU to effect the change in supply voltage magnitudes.

Generally, a component may be referred to as powered on or powered off. The component may be powered on if it is receiving supply voltage so that it may operate as designed. If the component is powered off, then it is not receiving the supply voltage and is not in operation. The component may also be referred to as powered up if it is powered on, and powered down if it is powered off. Powering up a component may refer to supplying the supply voltage to a component that is powered off, and powering down the component may refer to terminating the supply of the supply voltage to the component. Similarly, any subcomponent and/or the SOC 10 as a whole may be referred to as powered up/down, etc. A component may be a predefined block of circuitry which provides a specified function within the SOC 10 and which has a specific interface to the rest of the SOC 10. Thus, the peripherals 18A-18B, the CPU complex 14, the memory controller 22, and the SOC PMGR 16 may each be examples of a component.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 10:
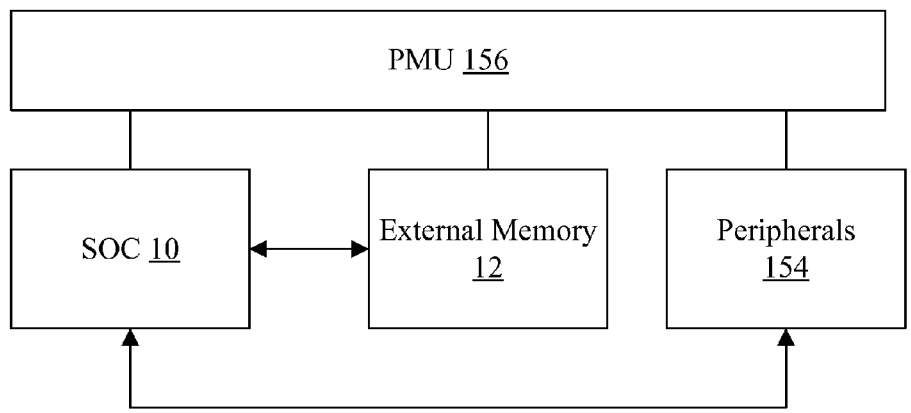
FIG. 10 is a block diagram of one embodiment of a system.

Turning next to FIG. 10, a block diagram of one embodiment of a system 150 is shown. In the illustrated embodiment, the system 150 includes at least one instance of the SOC 10 coupled to one or more peripherals 154 and the external memory 12. The PMU 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The PMU 156 may generally include the circuitry to generate supply voltages and to provide those supply voltages to other components of the system such as the SOC 10, the memory 12, various off-chip peripheral components 154 such as display devices, image sensors, user interface devices, etc. The PMU 156 may thus include programmable voltage regulators, logic to interface to the SOC 10 and more particularly the SOC PMGR 16 to receive voltage requests, etc.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An apparatus comprising:
a processor having a plurality of power states comprising:
a first processor core, wherein a first subset of the plurality of power states map to the first processor core; and
a second processor core, wherein a second subset of the plurality of power states map to the second processor core, and wherein the first subset and the second subset are non-overlapping;
a special purpose register interconnect coupled to the first processor core and the second processor core, the special purpose register interconnect providing access to a plurality of special purpose registers; and
a control circuit configured to control migration of processor state between the first processor core and the second processor core responsive to a change between a first processor state in the first subset and a second processor state in the second subset, wherein the control circuit is configured to cause transfer of register state, including a general purpose register state, from a source core of the first processor core and the second processor core to a target core of the first processor core and the second processor core over the special purpose register interconnect, and wherein, during a second time period prior to a first time period in which the transfer of register state is occurring, the source core is configured to access a first special purpose register on the special purpose register interconnect responsive to executing a first special purpose register instruction that specifies the first special purpose register.

2. The apparatus as recited in claim 1, wherein the special purpose interconnect is a ring interconnect coupling the first processor core, the second processor core, and one or more additional circuits that includes special purpose registers.

3. The apparatus as recited in claim 1, wherein the control circuit is configured to detect a plurality of write operations to a predetermined special purpose register address as a migration of register state and to route write data associated with the plurality of write operations for the source core to the target core over the special purpose register interconnect.

4. The apparatus as recited in claim 3, wherein the control circuit is configured to transmit instructions to the source core to write general purpose registers of the source core to the predetermined special purpose register address.

5. The apparatus as recited in claim 4, wherein the control circuit is configured to transmit instructions to the target core to read general purpose registers from the predetermined special purpose register address, wherein an order of the general purpose registers read by the target core is the same as an order of the general purpose registers written by the source core.

6. The apparatus as recited in claim 4, wherein the control circuit is configured to transfer special purpose register contents from the source core to the target core.

7. The apparatus as recited in claim 6, wherein the control circuit is configured to transmit read operations to read the special purpose registers in the source core, and wherein read responses from the source core are modified into write responses to the target core, the write responses including the special purpose register contents.

8. The apparatus as recited in claim 6, wherein a subset of the special purpose registers within the source core, excluding at least one special purpose register within the source core, is transferred to the target core.

9. The apparatus as recited in claim 1, wherein, subsequent to the transfer of the register state from the source core to the target core, the control circuit is configured to ensure that other processor state is retained.

10. The apparatus as recited in claim 9, wherein the other processor state comprises a wait for event state.

11. The apparatus as recited in claim 9, wherein the other processor state comprises debug state.

12. The apparatus as recited in claim 9, wherein the other processor state includes interrupt state.

13. The apparatus as recited in claim 1, wherein the first processor core has a first plurality of efficiency/performance characteristics that differ from a second plurality of efficiency/performance characteristics of the second processor core.

14. A method comprising:
detecting a change from a first power state mapped to a first processor core of a processor to a second power state mapped to a second processor core of the processor;
transferring register state, including a general purpose register state, from the first processor core to the second processor core responsive to detecting the change, the transferring performed during a first time period over a special purpose register interconnect; and
during a second time period prior to the first time period, the first processor core executing a first special purpose register instruction and accessing a first special purpose register specified by the first special purpose register instruction on the special purpose register interconnect.

15. The method as recited in claim 14, wherein transferring the register state comprises:
injecting a plurality of instructions into the first processor core to write a plurality of registers to a predetermined special purpose register address;
injecting a second plurality of instructions into the second processor core to read a second plurality of registers from the predetermined special purpose register address in a same order as the registers are written by the first processor core; and
routing data written to the predetermined special purpose address over the special purpose register interconnect to the second processor core.

16. A method comprising:
detecting a change from a first power state mapped to a first processor core of a processor to a second power state mapped to a second processor core of the processor;
transferring register state from the first processor core to the second processor core responsive to detecting the change, the transferring performed over a special purpose register interconnect that is used by the first and second processor cores to access special purpose registers;
transmitting read operations to the first processor core to read special purpose registers;
converting read responses generated for the special purpose register reads into write responses; and
routing the write responses to the second processor core.

17. The method as recited in claim 16 wherein transferring the register state comprises:
injecting instructions into the first processor core to write registers to a predetermined special purpose register address;
injecting instructions into the second processor core to read registers from the predetermined special purpose register address in a same order as the registers are written by the first processor core; and routing data written to the predetermined special purpose address over the special purpose register interconnect to the second processor core.

18. The method as recited in claim 16, further comprising ensuring that a wait for event state from the first processor core is retained in the second processor core.

19. The method as recited in claim 16, further comprising ensuring that interrupt state from the first processor core is retained in the second processor core.

20. The method as recited in claim 16, further comprising ensuring that debug state from the first processor core is retained in the second processor core.

* * * * *